United States Patent [19]
Maxwell et al.

[11] Patent Number: 6,063,432
[45] Date of Patent: May 16, 2000

[54] ARGININE OR LYSINE CONTAINING FRUIT HEALTHBAR FORMULATION

[75] Inventors: Andrew J. Maxwell, Fremont; John P. Cooke, Palo Alto; Thomas Martin Radke, Irwindale, all of Calif.

[73] Assignee: Cooke Pharma, Belmont, Calif.

[21] Appl. No.: 09/081,492

[22] Filed: May 19, 1998

[51] Int. Cl.[7] .............................. A23L 1/227; A23L 1/29; A23L 1/302
[52] U.S. Cl. ................................. 426/656; 426/2; 426/72; 426/639; 426/648; 426/660; 426/810
[58] Field of Search .................................. 426/72, 648, 2, 426/810, 639, 656, 660

[56] References Cited

U.S. PATENT DOCUMENTS

| | | | |
|---|---|---|---|
| 3,932,608 | 1/1976 | Anderson et al. | 426/660 |
| 4,605,561 | 8/1986 | Lang | 426/660 |
| 4,684,528 | 8/1987 | Godfrey | 426/660 |
| 4,888,187 | 12/1989 | Given, Jr. et al. | 426/660 |

FOREIGN PATENT DOCUMENTS

| | | |
|---|---|---|
| 0 363 879 | 4/1990 | European Pat. Off. . |
| 360049751 | 3/1985 | Japan . |
| 402128670 | 5/1990 | Japan . |

*Primary Examiner*—Helen Pratt
*Attorney, Agent, or Firm*—Bertram I. Rowland; Rae-Venter Law Group, P.C.

[57] ABSTRACT

Health bars are provided having high dosages of at least one of the amino acids L-arginine and L-lysine in conjunction with fruit solids and paste, protein and carbohydrates. A number of different fruit sources may be used, grapes finding particular use, and soy being a useful source of proteins. The bars are made by preparing a syrup at an elevated temperature, adding a fruit paste and cooling, followed by the addition of minor ingredients and mixing, the amino acids and a portion of the protein and mixing, followed by the remaining ingredients and formation as a bar.

18 Claims, No Drawings

ARGININE OR LYSINE CONTAINING FRUIT HEALTHBAR FORMULATION

INTRODUCTION

There is substantial emphasis today on having a healthy diet. Individuals are encouraged to avoid certain fats, while using other fats, to provide fiber in their diet, to take vitamins as supplements and to eat cruciferous vegetables and fruits. Despite the substantial advertising of the advantages of certain foods, control of calories and the detrimental effects of ignoring the advice, the fact remains that a substantial portion of the population has an unbalanced diet and is susceptible to various cardiovascular diseases.

Recently, it has been suggested that L-arginine and L-lysine, when used as supplements to a normal diet in relatively large doses, have salutary effects on cardiovascular function. The doses are sufficiently large that one would need to take a large number of pills or a large volume of powder to achieve the desired therapeutic dosage level. It is therefore important to provide formulations which would encourage use, provide the amino acids in a bioavailable form at the required dosages and be organoleptically acceptable. Unfortunately, the amino acids have an undesirable flavor, are highly basic and can readily react with a variety of other chemicals which may be found in foods, particularly when combined at elevated temperatures.

For a number of foods, an attractive method of presentation has been as a health bar, where the sugar and fat contents are relatively low and the ingredients are a source of healthy food substances. It is therefore desirable to develop formulations of healthbars which include at least one of L-arginine and L-lysine in useful amounts, where the healthbars are organoleptically acceptable and a small number of bars fulfills the daily requirements of the amino acids.

SUMMARY OF THE INVENTION

Healthbars are provided having a total of at least 2 g per bar of at least one of the amino acids L-arginine and L-lysine or their salts in conjunction with sugars, fruit components, protein, and vitamins and minerals. The healthbar weighs in the range of about 25–100 g. In a particular process, the healthbar is produced by combining sugars and fruit paste at an elevated temperature and then combining the syrup at a reduced temperature with the minor ingredients. After blending the minor ingredients in the syrup, the amino acid is added, particularly in conjunction with a protein extender, followed by bulking and food agents, particularly fruit pieces or other particulate edible ingredients providing the desired texture and flavor, and soy proteins. The resulting product is storage stable, has desirable organoleptic properties in being tasty, and provides a healthy combination of ingredients in collaboration with the amino acids.

DESCRIPTION OF THE SPECIFIC EMBODIMENTS

"Heart healthy bars" are provided as a dietary supplement or medical food to provide high levels of the amino acids L-arginine and/or L-lysine, as the base or physiologically acceptable salt, on a daily basis. The health bars are found to be organoleptically attractive while providing levels of the indicated amino acids resulting in improved vascular function. Use of the heart healthy bars may be prophylactic or therapeutic, may be used to prevent or alleviate a number of cardiovascular disorders and can enhance overall improved physical activity. The number of bars should provide a daily dosage of at least 5 g, preferably at least 6 g of the amino acids, and conveniently not more than about 12 g, usually not more than about 10 g. Therefore, each bar should have not less than about 2 g, usually not less than about 2.5 g, preferably at least 3 g and will generally be at least 2 weight %, more usually at least 2.5 weight %, preferably at least about 3 weight %, of the amino acids and have not more than about 12 weight %, usually not more than about 8 weight %, more usually not more than about 5 weight % of the amino acids. Of particular interest are healthbars having 4±1 weight percent of L-arginine, L-lysine, or their physiologically acceptable salts, particularly the hydrochloride salt.

Each bar will generally weigh from about 25 to 100 g, preferably from about 40 to 75 g and particular convenient is 40 to 60 g. There will be 3 major ingredients besides the amino acids: fruit solids and paste; carbohydrates (saccharides); and protein, particularly soy protein. In addition, there will be minor amounts of vitamins and fiber, particularly vitamins which are antioxidants, flavoring and additional ingredients which are commonly found in commercial food bars which are advertised as being healthy.

To provide a favorable texture and flavor, the major portion of the bar will be based on fruit sources, such as grapes (raisins), craisins (sugar infused cranberries), apple, berries, e.g. cranberry, raspberry, strawberry, loganberry, blackberry, billberry, blackberry, etc., peaches, apricots, pears, citrus, pineapple, banana, and the like, particularly one or more berries, apples and grapes. The fruit may be dried, treated, as with sulfur dioxide, a paste, candied, whole or powdered forms. Generally, the total amount of fruit will be at least about 10 weight %, usually at least 20 weight %, more usually at least about 25 weight % and frequently 30 weight % or more, generally, not more than about 40 weight %, more usually not more than about 35 weight %. Generally, each of the fruit types present will be present in at least about 1 weight % and not more than about 20 weight %, more usually not more than about 15 weight %. Of particular interest is having from about 7.5 to 12.5 weight % of raspberry fruit chips and from about 7.5 to 12.5 weight % of raisin paste. Other fruit components will generally be in the range of about 1 to 5 weight %.

The next major ingredient will be various forms of protein, particularly derived from soy, usually not more than about 4 different forms of soy, which may be employed as toasted grits, protein isolate, nuts, textured vegetable protein, soy flour, or the like. Generally, the soy protein will be present in at least 20 weight %, usually at least 25 weight % and not more than about 40 weight %, desirably in the range of about 25 to 35 weight %, each form of the protein being present in at least 5 weight %. The soy will usually be used as solids, supplying the major source of protein to the heart healthy bar.

The next major ingredient is carbohydrates (saccharides), often free of glucose as the monomer or oligomer, e.g. sucrose. The total amount of saccharides, normally hexasaccharides will be in the range of about 15 to 30 weight %, usually in the range of about 15 to 25 weight %. Saccharides of interest include maltitol, conveniently as a syrup, fructose, conveniently as a solid, honey, rice syrup, corn syrup, high fructose corn syrup, high maltose corn syrup, and the like. Maltitol, when present, will generally be present in from about 10 to 25 weight %. Fructose, when present, from other than the fruit present in the bar will be in the range of about 5 to 20 weight %. Mannitol may be substituted in whole or part for the other saccharides, particularly reduced saccharides. Glycine may also be employed as a sweetener in minor amounts, generally less than about 5 weight %.

There will generally be vitamins and, if desired, minerals may also be included. The vitamins and minerals will generally be present in at least 1%, more usually at least about 10%, and up to 100% or higher, of the recommended daily dosage of the ingredient. As indicated previously, vitamins of particular interest are vitamins which are antioxidants. Vitamins which may be included, include both antioxidant and non-antioxidant vitamins, such as vitamin A, $B_6$, and $B_{12}$, D, E, and K, thiamin, riboflavin, ascorbic acid, folic acid, niacinamide, pantothenic acid, biotin, etc. Other materials may include coenzyme Q and carnitine. Minerals of interest include calcium, iron, iodine, magnesium, zinc, selenium, copper, manganese, chromium, molybdenum, chloride, etc. When present, they may range from about 1 to 100% of the recommended daily dosage.

Other minor additives, generally ranging in total from about 2 to 15 weight %, individually being in the range of about 0.5 to 7.5 weight %, usually in the range of about 0.5 to 5 weight %, may be included to provide flavor, texture and/or appearance. These additives include malic acid, fiber for reduction of cholesterol, e.g. oat fiber, vegetable powder, etc., colorants, e.g. beet powder, annatto, carmine, caramel color, FD&C colors, etc., flavoring, e.g. chocolate, fruit, vanilla, confectionary particles, almonds etc.

The total number of calories for a 50 g bar will generally be less than about 300 cal, usually less than about 250 cal, with less than 30%, more usually less than 25%, of the calories being contributed by lipids. Where lipids are added, they will generally be present in less than 10 weight %, and desirably will be primarily polyunsaturated, including ω-3 polyunsaturated lipids.

Various elevated, ambient or reduced temperature processes may be employed. A convenient process which employs an elevated temperature stage is described below.

The heart healthy bar is prepared by combining a major portion (±50 weight %) or all of the carbohydrates (saccharides) at an elevated temperature, generally at least about 180° F., more usually at least about 210° F., and not more than about 260° F., preferably over the boiling point of water, in the range of about 240 to 250° F. After adding the fruit paste (raisin paste), which may be added in conjunction with other minor additives, and mixing, the product is then cooled below 175° F., preferably below about 150° F., conveniently in the range of about 120 to 150° F. The time for mixing will be under 5 min, a conventional food mixing apparatus being employed. At this time, the temperature may be allowed to go to ambient temperature. After adding the flavoring, and mixing for a short time, usually under 5 min, particularly under 2 min, the mixture may be scraped, quickly mixed again and the vitamins and minerals added, and optionally some of the additional minor ingredients, e.g. fiber and vegetable powder. Desirably, the vitamins, minerals and, as appropriate, the minor ingredients, are preblended and added as a single mixture. Mixing and scraping are performed in under 5 min, conveniently less than about 2 min for each operation. In the next step the amino acids are added in conjunction with a portion of the protein, e.g. soy protein, particularly the soy protein isolate. Again, the mixing is of short duration as indicated above, followed by scraping for a similar duration. The remaining ingredients may then be added followed by mixing and scraping, where after a brief scraping period, further mixing may be for up to 5 min to ensure the substantial homogeneity of the product. The mix is then extruded, cut into bars, and packaged.

The following table indicates a formulation which may be employed and the desired ranges in which the ingredients may be employed

TABLE 1

| Major Ingredients | Range (weight %) | |
|---|---|---|
| | Broad | Preferred |
| L-arginine or L-lysine (salt) | 2–12 | 2.5–8; 3–5 |
| Protein (total) | 20–50 | 25–45 |
| Soy sources | 20–50 | 25–45 |
| Fruit (total) | 20–50 | 20–45 |
| Raisins (paste) and craisins | 7.5–15 | 10–15 |
| Dried apples | 2–7.5 | 3–6 |
| Dried raspberry | 7.5–15 | 9–12 |
| Dried cranberry | 1–5 | 1–3 |
| Craisins | 1–5 | 1.5–4 |
| Carbohydrates (total) | 10–35 | 15–30 |
| Dietary fiber | 0–5 | 2–4 |

The following ingredients may be employed in the heart healthy bar to provide benefits which are additional to the basic purpose of the product, augmenting the various vitamins and minerals which may be obtained in a normal diet or may supplement or substitute for various vitamin and mineral supplements.

Ingredients of particular interest for use as a heart healthy bar in addition to the specific amino acids previously described are set forth in the following table:

| No. | Ingredient | Weight % range |
|---|---|---|
| 1. | Protein (total) | 25–35 |
| | soy protein isolate | 7.5–12.5 |
| | soy grits | 7.5–12.5 |
| | soy nuts | 7.5–12.5 |
| 2. | Fruit (total) | 20–35 |
| | raisins (paste) and craisins | 5–16 |
| | dried apple pieces | 0.2–6 |
| | raspberry fruit chips | 7.5–15 |
| | cranberry fruit chips | 1–5 |
| | craisins | 1–5 |
| 3. | Carbohydrates | 15–25 |
| | Maltitol syrup | 5–20 |
| | Fructose, crystalline | 4–10 |
| 4. | Glycine | 0, 2–6 |
| 5. | Malic acid (flavoring agent) | 0, 0.5–2.5 |
| 6. | Vitamins | 0, 1–3 |
| 7. | Flavoring | 2–6 |
| 8. | Fiber | 0, 0.5–2 |

When a 0 appears followed by a range, the 0 intends that the ingredient need not be present. Besides the ingredients described above, other ingredients may be present, usually in amounts not to exceed 3 weight %, usually not to exceed 2 weight %, to enhance flavor texture, appearance or as a processing aid.

The number of bars taken daily will be sufficient to provide the minimum supplemental dosage. Desirably the bars have a variety of flavors, so that one can vary the flavors daily. The amino acids are found to be bioavailable and aid in the prevention and treatment of cardiovascular dysfunction. Conditions of interest include atherosclerosis, restenosis, thrombosis. In addition, because the healthbars improve blood flow (enhancing endothelium dependent vasodilation), the healthbars find beneficial application in conditions where improved blood flow is beneficial, such as erectile dysfunction, vasospasm affecting any arteries, most especially the coronary, cerebral and digital arteries, and hypertension. Improved blood flow can enhance aerobic function, even in healthy normal individuals. Other benefits include lowering of uric acid, and improvement in postmenopausal systems and osteoarthritis symptoms.

The heart healthy bars should be taken for at least 2 weeks and may be taken substantially longer to maintain an enhanced level of the amino acids to provide enhanced levels of endothelial derived nitric oxide. The bars are safe, enjoyable and provide a pleasant taste without an undesirable after taste. The bars are storage stable under normal conditions for extended periods of time.

The following examples are offered by way of illustration and not by way of limitation.

EXPERIMENTAL

EXAMPLE 1

The following table provides the ingredients for an exemplary heart healthy bar having cranberry flavor.

| No. | Ingredient | Weight % |
| --- | --- | --- |
| 1 | Maltitol syrup | 13.1 |
| 2 | Fructose, crystalline | 6.30 |
| 3 | Glycine | 4.00 |
| 4 | Raisin paste | 11.50 |
| 5 | Malic acid | 1.50 |
| 6 | Natural flavors | 4.3 |
| 7 | Ascorbic acid | 1.00 |
| 8 | Folic acid | 0.0005 |
| 9 | Pyridoxine HCl | 0.012 |
| 10 | Cyanocobalamin | 0.013 |
| 11 | Niacinamide | 0.05 |
| 12 | Vitamin E acetate | 0.8745 |
| 13 | Oat fiber | 1.20 |
| 14 | Beet powder | 0.75 |
| 15 | Soy protein isolate | 10.00 |
| 16 | L-arginine hydrochloride | 6.0 |
| 17 | Toasted soybean pieces | 20.00 |
| 18 | Infused cranberry pieces | 2.50 |
| 19 | Dried apple pieces | 4.00 |
| 20 | Raspberry fruit pieces | 10.40 |
| 21 | Cranberry fruit pieces | 2.50 |

The composition was prepared by combining 1 and 2 and heating; to 245° F., followed by transferring to a mixer. To the heated composition was added 3,4 and 5 and mixed over 2 min. The mixture was cooled to 140° F. and 6 added and mixed for 1 min. To the mixture was then added a preblend of 7–14, followed by mixing for 2 min. 15 and 16 were then added, mixed for 2 min. Finally 17–21 were added and mixed for 4 min.

The bars which were prepared were found to have acceptance among individuals and were found to be effective in the treatment of persons at risk for atherosclerosis in substantially improving their cardiovascular condition. The following study was carried out. Of a total of 41 subjects, 38 completed the study. Criteria for selection of patients were that they were over 18 years of age, and had a total cholesterol >220 mg/dl and LDL cholesterol >130 mg/dl. Criteria for exclusion were: peripheral arterial disease of non-atherosclerotic nature; enrollment in another clinical trial or ingestion of another investigational drug within the past 30 days; plans to change activity which could affect the outcome of the disease state during the study; active malignant disease or history of breast tumors in family; history of disease state or surgery which affects gastrointestinal absorption; abnormal laboratory values; hypersensitivity to components of the healthbar; intolerance to sublingual nitroglycerin; uncontrolled hypertension; Type I diabetes; smokers of >7 cigarettes/week; concomitant administration of arginine-containing products or nitrate containing products which would be harmful for the subject to discontinue.

Of the 38 subjects completing the trial, 22 were males and 16 were females; the average age was 59±11 years; the mean total cholesterol was 268±32 mg/dl; the mean LDL was 178±31 mg/dl; the mean endothelium-dependent brachial artery reactivity at the screening visit was 9.9±7% above resting; overall compliance was 91%.

The protocol was for each patient to take 2 to 3 bars a day, each bar containing 4 g of L-arginine, where the patient would receive 8 or 12 g of L-arginine a day and 300 $\mu$g of folic acid. The study was structured to have a screening visit and obtain a first vascular function measurement; a study visit within 2 weeks to obtain a second vascular function measurement and dispense the bars; a second study visit 2 weeks later to obtain a third vascular function measurement and document any adverse effects.

The endothelium-dependent vascular reactivity improved from 9.9±7% to 24±9% (p <0.0001). The endothelium-independent vascular reactivity improved from 25±8% to 36±11%. There was no significance in the difference in the results between those taking 2 rather than 3 bars a day. There was no significant effect on serum chemistries or hematologic values during the course of the study. There was some favorable impact on the total cholesterol and VLDL levels and no significant effect on the serum lipid levels of LDL, triglycerides and HDL. An unexpected beneficial result was a decline in uric acid level. The adverse effects which were observed were minor, including flatulence, bloating, hiccups, headache, and a flu-like illness, which for the most part were resolved during the course of the study.

The conclusions from the study were that the heart healthy bar improves endothelium-dependent and, to a lesser extent, endothelium-independent brachial artery reactivity. Endothelial function is restored to the same degree of dysfunction before the study. The heart healthy bar favorably impacts the serum lipid profile with few adverse effects.

It is evident from the above results that the heart healthy bar provides for an easy, effective way to administer amino acids L-arginine and L-lysine in a pleasant desirable way at a therapeutic dose. The bars are attractive and enjoyable as a food supplement, augmenting the normal levels of the amino acids to approximately double the amount of the normal intake as a result of eating foods containing proteins. The amino acids are transported to the blood stream, where the amino acids are capable of augmenting the production of nitric oxide in a manner which aids the cardiovascular function. The use of the heart healthy bars provides an appropriate prophylactic and therapeutic dose to protect the cardiovascular system against various injuries, particularly atherosclerotic lesions, as well as improving cardiovascular function, allowing for improved physical activity.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A heart healthy bar substantially homogeneous and comprising at least about 2 weight % of at least one of amino acids L-arginine and L-lysine or their physiologically acceptable salts in combination with from about 20 to 50 weight % of protein, 20 to 50 weight % of fruit as paste and solids, from 10 to 35 weight % of carbohydrates, less than 10 weight % lipids, and 0 to 5 weight % of dietary fiber to form an organoleptically acceptable food supplement.

2. A bar according to claim 1, wherein said amino acids are present in at least 3 weight percent.

3. A bar according to claim 1, wherein said fruit as paste is raisin paste and said fruit as solids comprises, apples, raspberry and cranberry.

4. A bar according to claim 3, wherein said apples are in from about 2 to 7.5 weight %, said raspberry is present in from about 7.5 to 15 weight % and said cranberry is present in from 1 to 5 weight %.

5. A bar according to claim 1, wherein said protein is from soy.

6. A bar according to claim 1, further comprising at least one of the vitamins A, a member of the B complex, C, D, E, K, thiamin, riboflavin niacinamide and pantothenic acid.

7. A heart healthy bar comprising about 2.5–8 weight percent of L-arginine or its physiologically acceptable salts, 20 to 45 weight % if fruit as paste and solids, 25 to 45 weight % protein, from 15 to 30 weight % of carbohydrates, less than 10 weight % lipids, and 0 to 5 weight % of dietary fiber to form an organoleptically acceptable food supplement.

8. A bar according to claim 7, wherein said fruit as paste is raisin paste and said fruit as solids comprises, apples, raspberry and cranberry.

9. A bar according to claim 7 comprising from 2–6 weight % glycine wherein fructose is present as at least a portion of said carbohydrates.

10. A heart healthy bar comprising 2.5–8 weight percent of L-arginine or its physiologically acceptable salts, 25–35 weight % of soy protein, 20 to 35 weight % of fruit as paste and solids, comprising raisins, apples, raspberry and cranberry, 15–30 weight % carbohydrates comprising fructose and maltitol, less than 10 weight % lipids, and 0 to 5 weight % of dietary fiber to form an organoleptically acceptable food supplement.

11. A health healthy bar comprising 4±1 weight percent of L-arginine or its physiologically acceptable salts, 25–35 weight % of soy protein, 20 to 35 weight % of fruit as paste and solids, comprising raisins, apples, raspberry and cranberry, 15–30 weight % carbohydrates comprising fructose and maltitol, and 0 to 5 weight % of dietary fiber to form an organoleptically acceptable food supplement.

12. A heart healthy bar substantially homogeneous and comprising at least about 2 weight % of at least one of amino acids L-arginine and L-lysine or their physiologically acceptable salts in combination with from about 20 to 50 weight % of protein, 20 to 50 weight % of fruit as paste and solids, from 10 to 35 weight % of carbohydrates, less than 10 weight % lipids, and 0 to 5 weight % of dietary fiber to form an organoleptically acceptable food supplement, prepared by the method comprising:

combining at least a major portion of the carbohydrates at a temperature of at least about 180° F. with said fruit paste, cooling the mixture, adding a portion of said protein and said amino acids, and adding the remaining protein and fruit solids.

13. A heart healthy according to claim 12, wherein said heart healthy bar comprises 2.5–8 weight percent of L-arginine or its physiologically acceptable salts, 25–35 weight % of soy protein, 20 to 35 weight % of fruit as paste and solids, comprising raisins, apples, raspberry and cranberry, 15–30 weight % carbohydrates comprising fructose and maltitol, less than 10 to weight % lipids, and 0 to 5 weight % of dietary fiber.

14. A heart healthy bar substantially homogeneous and comprising at least about 3 weight % of at least one of amino acids L-arginine and L-lysine or their physiologically acceptable acid salts in combination with from about 20 to 50 weight % of protein, 20 to 50 weight % of fruit as paste and solids, from 10 to 35 weight % of carbohydrates, less than 10 weight % lipids, and 0 to 5 weight % of dietary fiber to form an organoleptically acceptable food supplement.

15. A heart healthy bar according to claim 14, wherein said amino acid is L-arginine.

16. A bar according to claim 14, further comprising at least one of the vitamins A, a member of the B complex C, D, E, K, thiamin, riboflavin, niacinamide and panthothenic acid.

17. A heart healthy bar substantially homogeneous and comprising at least about 3 weight % of L-arginine hydrochloride in combination with from about 20 to 50 weight % of protein, 20 to 50 weight % of fruit as paste and solids, from 10 to 35 weight % of carbohydrates, less than 10 weight % lipids, and 0 to 5 weight % of dietary fiber to form an organoleptically acceptable food supplement.

18. A bar according to claim 17, further comprising at least one of the vitamins A, a member of the B complex, C, D, E, K, thiamin, riboflavin, niacinamide and panthothenic acid.

* * * * *